(12) United States Patent
Deng et al.

(10) Patent No.: US 9,877,331 B2
(45) Date of Patent: Jan. 23, 2018

(54) RESOURCE DETERMINING METHOD AND APPARATUS

(71) Applicant: HUAWEI TECHNOLOGIES CO., LTD., Shenzhen (CN)

(72) Inventors: Tianle Deng, Shanghai (CN); Haiyan Luo, Shanghai (CN); Xiao Chen, Shenzhen (CN); Guohua Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 138 days.

(21) Appl. No.: 14/885,485

(22) Filed: Oct. 16, 2015

(65) Prior Publication Data

US 2016/0044688 A1 Feb. 11, 2016

Related U.S. Application Data

(63) Continuation of application No. PCT/CN2013/074465, filed on Apr. 19, 2013.

(51) Int. Cl.
*H04W 4/00* (2009.01)
*H04W 72/08* (2009.01)
(Continued)

(52) U.S. Cl.
CPC ......... *H04W 72/082* (2013.01); *H04W 16/14* (2013.01); *H04W 72/044* (2013.01)

(58) Field of Classification Search
CPC .. H04W 72/082; H04W 72/044; H04W 16/14
See application file for complete search history.

(56) References Cited

U.S. PATENT DOCUMENTS

2004/0002207 A1 1/2004 Yu
2004/0022207 A1* 2/2004 Leung ................... H04W 52/24
370/321
(Continued)

FOREIGN PATENT DOCUMENTS

CN 101212764 7/2008
CN 101977388 A 2/2011
(Continued)

OTHER PUBLICATIONS

PCT International Search Report dated Jan. 23, 2014 in corresponding International Patent Application No. PCT/CN2013/074465.
(Continued)

*Primary Examiner* — Afshawn Towfighi
(74) *Attorney, Agent, or Firm* — Staas & Halsey LLP

(57) ABSTRACT

The present application discloses a resource determining method and apparatus, which relates to the communications field and can reduce co-channel interference between systems of different standards that share a wireless spectrum resource. The method includes: acquiring relationship information of interference imposed on a first cell by a second cell, where the relationship information of interference is used to indicate interference imposed on the first cell by the second cell in a time-frequency domain, and the second cell and the first cell have different standards; and determining time-frequency resource information of the second cell according to the relationship information of interference, where the time-frequency resource information of the second cell is used for the second cell to perform time-frequency resource allocation.

20 Claims, 8 Drawing Sheets

---

A multi-standard network controller acquires relationship information of interference from a second cell to a first cell, where the relationship information of interference is used to indicate interference from the second cell to the first cell in a time-frequency domain, and the second cell and the first cell have different standards — S101

The multi-standard network controller determines time-frequency resource information of the second cell according to the relationship information of interference, where the time-frequency resource information of the second cell is used for the second cell to perform time-frequency resource allocation — S102

(51) Int. Cl.
*H04W 16/14* (2009.01)
*H04W 72/04* (2009.01)

(56) References Cited

U.S. PATENT DOCUMENTS

| | | | |
|---|---|---|---|
| 2006/0133403 A1* | 6/2006 | Chun | H04W 72/0406 370/431 |
| 2010/0040184 A1 | 2/2010 | Haralabidis et al. | |
| 2012/0140690 A1* | 6/2012 | Choi | G01S 19/03 370/311 |
| 2012/0236766 A1 | 9/2012 | Haralabidis et al. | |
| 2013/0315183 A1 | 11/2013 | Xiang et al. | |

FOREIGN PATENT DOCUMENTS

| | | |
|---|---|---|
| CN | 102118758 | 7/2011 |
| CN | 102227148 | 10/2011 |
| CN | 102291840 | 12/2011 |
| CN | 102340782 | 2/2012 |
| CN | 102572920 | 7/2012 |
| CN | 102723913 | 10/2012 |
| CN | 102905356 | 1/2013 |
| EP | 1 895 795 A2 | 3/2008 |
| WO | 2012/083692 A1 | 6/2012 |
| WO | 2012/093289 A1 | 7/2012 |
| WO | 2012/100548 A1 | 8/2012 |

OTHER PUBLICATIONS

International Search Report dated Jan. 23, 2014 in corresponding international application PCT/CN2013/074465.

Chinese Office Action dated Aug. 24, 2017 in corresponding Chinese Patent Application No. 201380002818.0.

* cited by examiner

RESOURCE DETERMINING METHOD AND APPARATUS

CROSS-REFERENCE TO RELATED APPLICATIONS

This application is a continuation of International Application No. PCT/CN2013/074465, filed on Apr. 19, 2013, which is hereby incorporated by reference in its entirety.

TECHNICAL FIELD

The present invention relates to the communications field, and in particular, to a resource determining method and apparatus.

BACKGROUND

With rapid expansion of communications networks and rapid development of data services, a user requirement on a wireless spectrum resource increases accordingly. Because the wireless spectrum resource is limited, it is essential to properly plan and effectively use the wireless spectrum resource.

In the prior art, a method for sharing a wireless spectrum resource by systems of different standards is used to improve utilization of the wireless spectrum resource. However, a problem caused due to sharing of the wireless spectrum resource is co-channel interference between the systems of different standards. In the prior art, there is no effective solution to this problem.

SUMMARY

Embodiments of the present invention provide a resource determining method and apparatus, which can reduce co-channel interference between systems of different standards that share a wireless spectrum resource.

To achieve the foregoing objective, the following technical solutions are adopted in the embodiments of the present invention:

According to a first aspect, the present invention provides a resource determining method, including:
  acquiring relationship information of interference imposed on a first cell by a second cell, where the relationship information of interference is used to indicate interference imposed on the first cell by the second cell in a time-frequency domain, and the second cell and the first cell have different standards; and
  determining time-frequency resource information of the second cell according to the relationship information of interference, where the time-frequency resource information of the second cell is used for the second cell to perform time-frequency resource allocation.

With reference to the first aspect, in a first possible implementation manner, the relationship information of interference includes strength of a signal of the second cell, strength information of interference from a signal of the second cell to a signal of the first cell, or information about a path loss from the second cell to the first cell.

With reference to the foregoing first aspect or first possible implementation manner of the first aspect, in a second possible implementation manner, the determining time-frequency resource information of the second cell according to the relationship information of interference includes:
  if a time-frequency resource allocation request sent by the second cell is received, allocating the time-frequency resource information of the second cell according to the relationship information of interference.

With reference to the foregoing second possible implementation manner of the first aspect, in a third possible implementation manner, the method further includes:
  determining time-frequency resource information of the first cell according to the relationship information of interference, where the time-frequency resource information of the first cell is used for the first cell to perform time-frequency resource allocation.

With reference to the foregoing second possible implementation manner of the first aspect, in a fourth possible implementation manner, the acquiring relationship information of interference imposed on a first cell by a second cell includes:
  acquiring network plan data or drive test data, where the network plan data includes location information of the first cell and location information of the second cell, and the drive test data includes strength of a signal that is of the second cell and is received by a drive test terminal within the first cell; and determining the relationship information of interference according to the network plan data or the drive test data; or
  acquiring strength of a signal of the second cell and carrier configuration information of the second cell, and determining the relationship information of interference according to the strength of a signal and the carrier configuration information.

With reference to the foregoing fourth possible implementation manner of the first aspect, in a fifth possible implementation manner, the acquiring strength of a signal of the second cell includes:
  sending a first measurement instruction to first user equipment, where the first measurement instruction is used to instruct the first user equipment to measure the strength of a signal of the second cell; and
  receiving the strength, sent by the first user equipment, of the signal of the second cell.

With reference to the foregoing fourth possible implementation manner of the first aspect or fifth possible implementation manner of the first aspect, in a sixth possible implementation manner, the acquiring strength of a signal of the second cell and carrier configuration information of the second cell, and determining the relationship information of interference according to the strength of a signal and the carrier configuration information includes:
  determining the relationship information of interference according to the strength of a signal of the second cell, the carrier configuration information of the second cell, and carrier power configuration information of the second cell.

With reference to the foregoing sixth possible implementation manner of the first aspect, in a seventh possible implementation manner, the carrier configuration information includes information used to indicate a carrier configured for the second cell, and the carrier power configuration information includes information used to indicate transmit power of the carrier configured for the second cell.

With reference to the foregoing first aspect or any implementation manner of the first possible implementation manner to the seventh possible implementation manner of the first aspect, in an eighth possible implementation manner, the allocating the time-frequency resource information of the second cell according to the relationship information of interference includes:
  determining the time-frequency resource information of the second cell according to the relationship information of interference and information about transmit power in a timeslot occupied by the second cell.

With reference to the foregoing first aspect or any implementation manner of the first possible implementation manner to the eighth possible implementation manner of the first aspect, in a ninth possible implementation manner, the time-frequency resource information of the second cell includes carrier configuration information or timeslot configuration information.

With reference to any implementation manner of the foregoing second possible implementation manner to ninth possible implementation manner of the first aspect, in a tenth possible implementation manner, the time-frequency resource information of the first cell includes information used to indicate a time-frequency resource that the first cell avoids scheduling, or information used to indicate a time-frequency resource on which the first cell performs scheduling with a lower-order modulation and coding scheme MCS in a time-frequency domain.

According to a second aspect, the present invention provides a resource determining method, including:
acquiring time-frequency resource information of a first cell, where the time-frequency resource information of the first cell is used for the first cell to perform time-frequency resource allocation; and
performing time-frequency resource allocation according to the time-frequency resource information of the first cell.

With reference to the foregoing second aspect, in a first possible implementation manner, the acquiring time-frequency resource information of a first cell includes:
receiving time-frequency resource information that is of the first cell and sent by a multi-standard network controller, where
the time-frequency resource information of the first cell is sent by the multi-standard network controller to the first cell after the multi-standard network controller acquires relationship information of interference from a second cell to the first cell and determines the time-frequency resource information of the first cell according to the relationship information of interference, where the relationship information of interference is used to indicate interference imposed on the first cell by the second cell in a time-frequency domain, and the second cell and the first cell have different standards.

With reference to the foregoing second aspect, in a second possible implementation manner, the acquiring time-frequency resource information of a first cell includes:
acquiring relationship information of interference from a second cell to the first cell, where the relationship information of interference is used to indicate interference imposed on the first cell by the second cell in a time-frequency domain, and the second cell and the first cell have different standards; and
determining the time-frequency resource information of the first cell according to the relationship information of interference to the first cell.

With reference to the foregoing second aspect or first possible implementation manner of the second aspect or second possible implementation manner of the second aspect, in a third possible implementation manner, the performing time-frequency resource allocation according to the time-frequency resource information of the first cell includes:
configuring a second carrier of the first cell according to the time-frequency resource information of the first cell and by using a first carrier of the first cell, where the second carrier includes a time-frequency resource shared by the first cell and the second cell.

According to a third aspect, the present invention provides a resource determining method, including:
acquiring time-frequency resource information of a second cell, where the time-frequency resource information of the second cell is determined according to relationship information of interference after a multi-standard network controller or a first cell acquires the relationship information of interference imposed on the first cell by the second cell, where the relationship information of interference is used to indicate interference imposed on the first cell by the second cell in a time-frequency domain, and the second cell and the first cell have different standards; and
performing time-frequency resource allocation according to the time-frequency resource information of the second cell.

With reference to the foregoing third aspect, in a first possible implementation manner, the method further includes:
sending a time-frequency resource allocation request to the multi-standard network controller or the first cell, where the time-frequency resource request is used to instruct the multi-standard network controller or the first cell to allocate the time-frequency resource information of the second cell to the second cell.

According to a fourth aspect, the present invention provides a multi-standard network controller, including:
a processor, configured to: acquire relationship information of interference imposed on a first cell by a second cell, where the relationship information of interference is used to indicate interference imposed on the first cell by the second cell in a time-frequency domain, and the second cell and the first cell have different standards; and determine time-frequency resource information of the second cell according to the relationship information of interference, where the time-frequency resource information of the second cell is used for the second cell to perform time-frequency resource allocation.

With reference to the fourth aspect, in a first possible implementation manner, the relationship information of interference includes strength of a signal of the second cell, strength information of interference from a signal of the second cell to a signal of the first cell, or information about a path loss from the second cell to the first cell.

With reference to the foregoing fourth aspect or first possible implementation manner of the fourth aspect, in a second possible implementation manner, the processor is specifically configured to: if a time-frequency resource allocation request sent by the second cell is received, allocate the time-frequency resource information of the second cell according to the relationship information of interference.

With reference to the foregoing second possible implementation manner of the fourth aspect, in a third possible implementation manner, the processor is further configured to determine time-frequency resource information of the first cell according to the relationship information of interference, where the time-frequency resource information of the first cell is used for the first cell to perform time-frequency resource allocation.

With reference to the foregoing second possible implementation manner of the fourth aspect, in a fourth possible implementation manner, the processor is specifically configured to: acquire network plan data or drive test data, where the network plan data includes location information of the first cell and location information of the second cell, and the drive test data includes strength of a signal that is of the second cell and is received by a drive test terminal within the first cell; and determine the relationship information of interference according to the network plan data or the drive test data; or the processor is specifically configured to: acquire strength of a signal of the second cell and carrier configuration information of the second cell, and determine the relationship information of interference according to the strength of a signal and the carrier configuration information.

With reference to the foregoing fourth possible implementation manner of the fourth aspect, in a fifth possible implementation manner, the multi-standard network controller further includes:

a transmitter, configured to send a first measurement instruction to first user equipment, where the first measurement instruction is used to instruct the first user equipment to measure the strength of a signal of the second cell; and a receiver, configured to receive the strength, sent by the first user equipment, of the signal of the second cell.

With reference to the foregoing fourth possible implementation manner of the fourth aspect or fifth possible implementation manner of the fourth aspect, in a sixth possible implementation manner, the processor is specifically configured to determine the relationship information of interference according to the strength of a signal of the second cell, the carrier configuration information of the second cell, and carrier power configuration information of the second cell.

With reference to the foregoing sixth possible implementation manner of the fourth aspect, in a seventh possible implementation manner, the carrier configuration information includes information used to indicate a carrier configured for the second cell, and the carrier power configuration information includes information used to indicate transmit power of the carrier configured for the second cell.

With reference to the foregoing fourth aspect or any implementation manner of the first possible implementation manner to the seventh possible implementation manner of the fourth aspect, in an eighth possible implementation manner, the processor is specifically configured to determine the time-frequency resource information of the second cell according to the relationship information of interference and information about transmit power in a timeslot occupied by the second cell.

With reference to the foregoing fourth aspect or any implementation manner of the first possible implementation manner to the eighth possible implementation manner of the fourth aspect, in a ninth possible implementation manner, the time-frequency resource information of the second cell includes carrier configuration information or timeslot configuration information.

With reference to any implementation manner of the foregoing third possible implementation manner of the fourth aspect to ninth possible implementation manner of the fourth aspect, in a tenth possible implementation manner, the time-frequency resource information of the first cell includes information used to indicate a time-frequency resource that the first cell avoids scheduling, or information used to indicate a time-frequency resource on which the first cell performs scheduling with a lower-order modulation and coding scheme MCS in a time-frequency domain.

According to a fifth aspect, the present invention provides a base station, including:

a processor, configured to: acquire time-frequency resource information of a first cell, where the time-frequency resource information of the first cell is used for the first cell to perform time-frequency resource allocation; and perform time-frequency resource allocation according to the time-frequency resource information of the first cell.

With reference to the foregoing fifth aspect, in a first possible implementation manner, the base station further includes:

a receiver, configured to: receive time-frequency resource information that is of the first cell and sent by a multi-standard network controller, where the time-frequency resource information of the first cell is sent by the multi-standard network controller to the first cell after the multi-standard network controller acquires relationship information of interference from a second cell to the first cell and determines the time-frequency resource information of the first cell according to the relationship information of interference, where the relationship information of interference is used to indicate interference imposed on the first cell by the second cell in a time-frequency domain, and the second cell and the first cell have different standards.

With reference to the foregoing fifth aspect, in a second possible implementation manner, the processor is specifically configured to: acquire relationship information of interference from a second cell to the first cell, where the relationship information of interference is used to indicate interference imposed on the first cell by the second cell in a time-frequency domain, and the second cell and the first cell have different standards; and determine the time-frequency resource information of the first cell according to the relationship information of interference to the first cell.

With reference to the foregoing fifth aspect or first possible implementation manner of the fifth aspect or second possible implementation manner of the fifth aspect, in a third possible implementation manner, the processor is specifically configured to configure a second carrier of the first cell according to the time-frequency resource information of the first cell and by using a first carrier of the first cell, where the second carrier includes a time-frequency resource shared by the first cell and the second cell.

According to a sixth aspect, the present invention provides a base station, including:

a processor, configured to: acquire time-frequency resource information of a second cell, where the time-frequency resource information of the second cell is determined according to relationship information of interference after a multi-standard network controller or a first cell acquires the relationship information of interference imposed on the first cell by the second cell, where the relationship information of interference is used to indicate interference imposed on the first cell by the second cell in a time-frequency domain, and the second cell and the first cell have different standards; and perform time-frequency resource allocation according to the time-frequency resource information of the second cell.

With reference to the foregoing sixth aspect, in a first possible implementation manner, the base station further includes:

a transmitter, configured to send a time-frequency resource allocation request to the multi-standard network controller or the first cell, where the time-frequency resource request is used to instruct the multi-standard network controller or the first cell to allocate the time-frequency resource information of the second cell to the second cell.

The embodiments of the present invention provide a resource determining method and apparatus. Relationship information of interference imposed on a first cell by a second cell is acquired, where the relationship information of interference is used to indicate interference imposed on the first cell by the second cell in a time-frequency domain, and the second cell and the first cell have different standards; and time-frequency resource information of the second cell is determined according to the relationship information of interference, where the time-frequency resource information of the second cell is used for the second cell to perform time-frequency resource allocation. According to this solution, relationship information of interference from an interfering cell (that is, a second cell of a second standard system) to an interfered cell (that is, a first cell of a first standard system) is acquired, and time-frequency resource information of the interfering cell is determined according to the relationship information of interference; therefore, interference from the interfering cell to the interfered cell can be reduced after the interfering cell performs time-frequency resource allocation according to the time-frequency resource information.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

A standard of a cell described in this specification may be a standard of a current 2G or 3G communications system, or a next-generation communications system. These communications systems include but are not limited to: a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a single carrier FDMA (SC-FDMA) system, a general packet radio service (GPRS) system, a Long Term Evolution (LTE) system, and other communications systems of this type.

User equipment may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (RAN). The wireless terminal may be a mobile terminal, such as a mobile phone (also referred to as a "cellular" phone) or a computer with a mobile terminal, for example, may be a portable, pocket-sized, handheld, computer built-in, or in-vehicle mobile apparatus, which exchanges voice and/or data with the radio access network. For example, it may be a device such as a personal communications service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, an access point, a remote terminal, an access terminal, a user terminal, a user agent, a user device, or user equipment.

Embodiment 1

Figure 1:
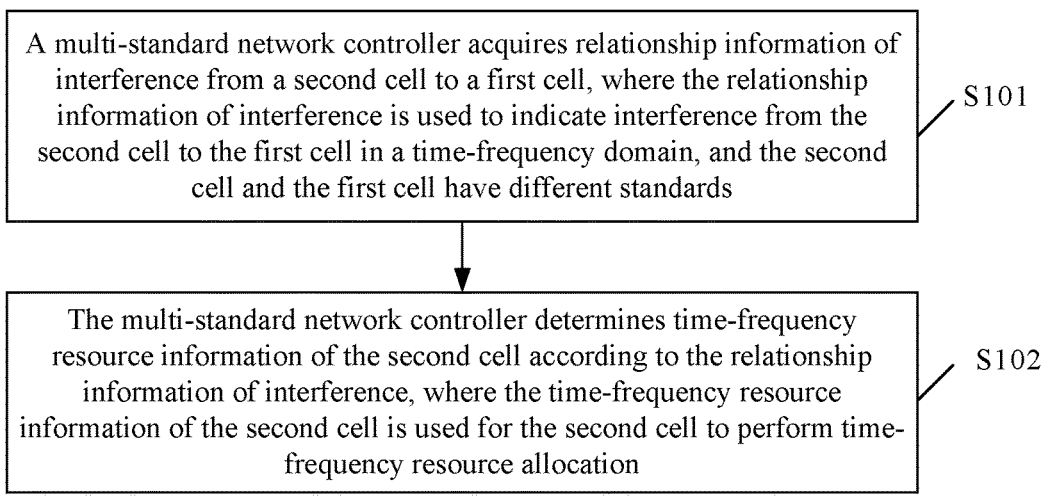
FIG. 1 is a first schematic flowchart of a resource determining method according to an embodiment of the present invention.

This embodiment of the present invention provides a resource determining method, and the method is a method on the side of a multi-standard network controller. As shown in FIG. 1, the method includes the following content:

S101. The multi-standard network controller acquires relationship information of interference imposed on a first cell by a second cell, where the relationship information of interference is used to indicate interference imposed on the first cell by the second cell in a time-frequency domain, and the second cell and the first cell have different standards.

In this embodiment of the present invention, the second cell and the first cell have different standards. For example, these standards may include a GSM standard, a CDMA standard, a TDMA standard, a WCDMA standard, an FDMA standard, an OFDMA standard, an SC-FDMA standard, a GPRS standard, an LTE standard, and other communications system standards of such a type. The first cell and the second cell may have different standards in a same communications system (for example, two cells of different standards in a same multi-standard base station), or may be two cells of communications systems of different standards.

In this embodiment of the present invention, the first cell and the second cell may share a wireless spectrum resource, that is, both the first cell and the second cell use a time-frequency resource of a same frequency band to perform service transmission. Specifically, an example in which a standard of the first cell is an LTE standard and a standard of the second cell is a GSM standard is used. In a scenario, both the first cell and the second cell use a wireless spectrum resource of 800 MHz to 810 MHz to perform service transmission. In a case in which a cell of the GSM standard is compared with a cell of the LTE standard, transmit power in the cell of the GSM standard is higher, where transmit power of a carrier is 20 watts (W) approximately; transmit power in the cell of the LTE standard is lower, where transmit power of a physical resource block (PRB) is 0.8 W approximately. Therefore, when the first cell and the second cell share a wireless spectrum resource, the second cell severely interferes with the first cell. The multi-standard network controller may acquire the relationship information of interference imposed on the first cell by the second cell, where the relationship information of interference is used to indicate time-frequency resources (for example, PRBs or timeslots) on which the second cell interferes with the first cell.

Optionally, in the resource determining method in this embodiment of the present invention, a method for acquiring, by a multi-standard network controller, relationship information of interference imposed on a first cell by a second cell specifically includes: acquiring network plan data or drive test data, where the network plan data includes location information of the first cell and location information of the second cell, and the drive test data includes strength of a signal that is of the second cell and is received by a drive test terminal within the first cell, and determining the relationship information of interference according to the network plan data or the drive test data; or acquiring strength of a signal of the second cell and carrier configuration information of the second cell, and determining the relationship information of interference according to the strength of a signal and the carrier configuration information.

It should be noted that in this embodiment of the present invention, the "time-frequency domain" refers to a time domain and/or a frequency domain, and accordingly, the time-frequency resource refers to a timeslot resource or a frequency resource.

S102. The multi-standard network controller determines time-frequency resource information of the second cell according to the relationship information of interference, where the time-frequency resource information of the second cell is used for the second cell to perform time-frequency resource allocation.

Further, the determining, by the multi-standard network controller, time-frequency resource information of the second cell according to the relationship information of interference includes: if a time-frequency resource allocation request sent by the second cell is received, allocating, by the multi-standard network controller, the time-frequency resource information of the second cell according to the relationship information of interference. Optionally, the time-frequency resource allocation request may be carrier allocation request information or timeslot allocation request information.

Specifically, as a service of the second cell changes, for example, for a service request of a new user, the second cell sends a time-frequency resource allocation request to the multi-standard network controller, so that the multi-standard network controller may determine the time-frequency resource information of the second cell according to the acquired relationship information of interference imposed on the first cell by the second cell. The second cell may perform time-frequency resource allocation according to the time-frequency resource information that is of the second cell and is determined by the multi-standard network controller, so as to avoid or reduce interference imposed on the first cell by the second cell. For example, when initiating a service, the second cell may choose a carrier that does not cause interference to the first cell, or the second cell may not schedule an PRB or a timeslot that may cause interference to the first cell.

The multi-standard network controller in this embodiment of the present invention may be an independent network server, may be an access network device (for example, a base station or a base station controller) of the first cell or a core network device, may be an access network device of the second cell or a core network device of the second cell, or may be neither the access network device of the first cell or the core network device, nor the access network device of the second cell or the core network device.

A person skilled in the art may understand that, in a case in which a GSM system is used as an example, each Time Division Multiple Access (Time Division Multiple Access, TDMA) frame on a carrier includes eight timeslots (which are separately a slot 0, a slot 1 . . . , and a slot 7), and a length of each timeslot may be 0.557 ms. It may be learned that the carrier allocation request information is used to request the multi-standard network controller to allocate a to-be-used carrier to the second cell. Compared with the carrier allocation request information, the timeslot allocation request information is more specific, that is, the timeslot allocation request information is used to request the multi-standard network controller to allocate a timeslot in the carrier to the second cell.

Further, after the multi-standard network controller receives the time-frequency resource allocation request sent by the second cell, the multi-standard network controller determines the time-frequency resource information of the second cell according to the relationship information of interference. Specifically, a method for determining, by the multi-standard network controller, the time-frequency resource information of the second cell according to the relationship information of interference includes: aligning, by the multi-standard network controller, a time resource of the second cell with a time resource of the first cell according to the relationship information of interference, and further generating the time-frequency resource information of the second cell, where a time-frequency resource of the second cell includes a time resource and/or a frequency resource.

Further, the method further includes: determining, by the multi-standard network controller, time-frequency resource information of the first cell according to the relationship information of interference, where the time-frequency resource information of the first cell is used for the first cell to perform time-frequency resource allocation.

Further, after the multi-standard network controller determines the time-frequency resource information of the first cell, the method further includes: sending, by the multi-standard network controller, the time-frequency resource information of the first cell to the first cell, so that the first cell performs time-frequency resource allocation according to the time-frequency resource information of the first cell.

The time-frequency resource information of the first cell includes information about interference degree of interference imposed on the first cell by the second cell on a time-frequency resource. The performing, by the first cell, time-frequency resource allocation according to the time-frequency resource information of the first cell includes: determining, by the first cell according to the time-frequency resource information of the first cell, not to schedule a time resource indicated by the time-frequency resource information of the first cell, or to perform scheduling with a lower-order modulation and coding scheme MCS, based on the degree information of interference, on a time-frequency resource indicated by the time-frequency resource information of the first cell. That is, the time-frequency resource information of the first cell includes information used to indicate a time-frequency resource that the first cell avoids scheduling, or information used to indicate a time-frequency resource on which the first cell performs scheduling with a lower-order modulation and coding scheme (Modulation and Coding Scheme, MCS) MCS in a time-frequency domain.

Further, before S102, the method may further include: receiving information about transmit power in a timeslot occupied by the second cell, where the information about the transmit power is sent by the second cell; then, S102 specifically includes: determining the time-frequency resource information of the second cell according to the relationship information of interference and the information about the transmit power in the timeslot occupied by the second cell.

Further, after the multi-standard network controller determines the time-frequency resource information of the second cell, the multi-standard network controller sends the time-frequency resource information of the second cell to the second cell, so that the second cell performs time-frequency resource allocation according to the time-frequency resource information of the second cell. It may be learned from the foregoing embodiment that the time-frequency resource allocation request sent by the second cell to the multi-standard network controller may be carrier allocation request information or timeslot allocation request information; then, the time-frequency resource information, sent by the multi-standard network controller to the second cell and corresponding to the time-frequency resource allocation request, of the second cell may also include a carrier configuration manner or a timeslot configuration manner; and further, the second cell performs carrier configuration or timeslot configuration in the carrier configuration manner or the timeslot configuration manner.

This embodiment of the present invention provides a resource determining method. A multi-standard network controller acquires relationship information of interference imposed on a first cell by a second cell, where the relationship information of interference is used to indicate interference imposed on the first cell by the second cell in a time-frequency domain, and the second cell and the first cell have different standards; and determines time-frequency resource information of the second cell according to the relationship information of interference, where the time-frequency resource information of the second cell is used for the second cell to perform time-frequency resource allocation. According to this solution, relationship information of interference from an interfering cell (that is, a second cell) to an interfered cell (that is, a first cell) is acquired, and time-frequency resource information of the interfering cell is determined according to the relationship information of interference; therefore, interference from the interfering cell to the interfered cell can be reduced after the interfering cell performs time-frequency resource allocation according to the time-frequency resource information.

Figure 2:
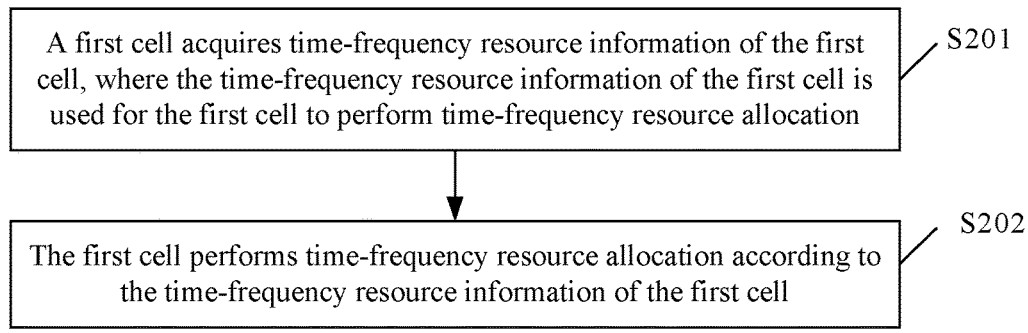
FIG. 2 is a second schematic flowchart of a resource determining method according to an embodiment of the present invention.

This embodiment of the present invention further provides a resource determining method, and the method is a method on the side of a first cell. As shown in FIG. 2, the method includes the following content:

S201. The first cell acquires time-frequency resource information of the first cell, where the time-frequency resource information of the first cell is used for the first cell to perform time-frequency resource allocation.

In an implementation manner of this embodiment of the present invention, a method for acquiring, by the first cell, time-frequency resource information of the first cell may specifically include:

receiving time-frequency resource information that is of the first cell and sent by a multi-standard network controller, where the time-frequency resource information of the first cell is sent by the multi-standard network controller to the first cell after the multi-standard network controller acquires relationship information of interference from a second cell to the first cell and determines the time-frequency resource information of the first cell according to the relationship information of interference, where the relationship information of interference is used to indicate interference imposed on the first cell by the second cell in a time-frequency domain, and the second cell and the first cell have different standards.

In another implementation manner of this embodiment of the present invention, a method for acquiring, by the first cell, time-frequency resource information of the first cell may specifically include:

acquiring relationship information of interference from a second cell to the first cell, where the relationship information of interference is used to indicate interference imposed on the first cell by the second cell in a time-frequency domain, and the second cell and the first cell have different standards; and determining the time-frequency resource information of the first cell according to the relationship information of interference to the first cell.

S202. The first cell performs time-frequency resource allocation according to the time-frequency resource information of the first cell.

The performing time-frequency resource allocation according to the time-frequency resource information of the first cell includes: configuring a second carrier of the first cell according to the time-frequency resource information of the first cell and by using a first carrier of the first cell, where the second carrier includes a time-frequency resource shared by the first cell and the second cell.

A person skilled in the art may understand that, in a time domain, a physical downlink control channel (PDCCH) of the first cell generally occupies first three orthogonal frequency division multiplexing (OFDM) symbols of each timeslot of 1 ms. In a frequency domain, a PDCCH generally occupies all bandwidths. For example, the first cell occupies 10 MHz, and in this case, there are PDCCHs in 50 PRBs. Therefore, even if strong interference to a physical downlink shared channel (PDSCH) on a PRB4 is avoided by means of scheduling, strong interference to a PDCCH on the PRB4 cannot be avoided. Therefore, to avoid strong interference from the second cell to the PDCCH, a method that may be used is cross-carrier scheduling. That is, it is assumed that the first cell works in a multi-carrier mode, and occupies a carrier 1 and a carrier 2 at the same time, where a PDSCH of the carrier 2 may be allocated by using a PDCCH of the carrier 1, that is, the carrier 2 may not have a PDCCH. That is, the first cell described in the foregoing allocates the second carrier of the first cell by using the first carrier of the first cell.

This embodiment of the present invention provides a resource determining method. A first cell acquires time-frequency resource information of the first cell, where the time-frequency resource information of the first cell is used for the first cell to perform time-frequency resource allocation; and performs time-frequency resource allocation according to the time-frequency resource information of the first cell. According to this solution, the time-frequency resource information of the first cell is acquired, and the time-frequency resource information of the first cell is determined according to relationship information of interference from an interfering cell (that is, a second cell) to an interfered cell (that is, a first cell); therefore, interference from the interfering cell to the interfered cell can be reduced after the interfered cell performs time-frequency resource allocation according to the time-frequency resource information.

Figure 3:
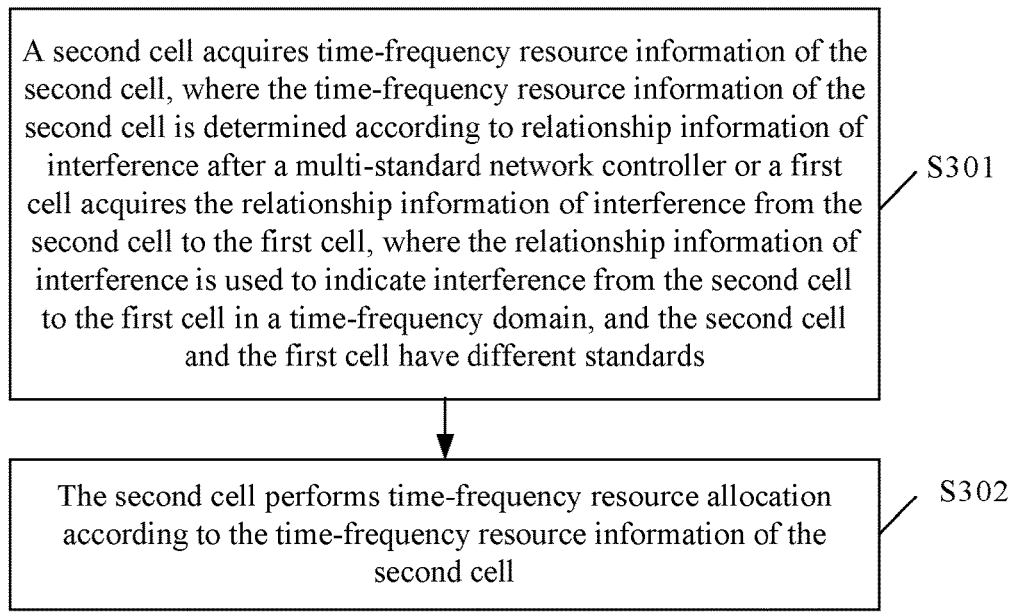
FIG. 3 is a third schematic flowchart of a resource determining method according to an embodiment of the present invention.

This embodiment of the present invention further provides a resource determining method, and the method is a method on the side of a second cell. As shown in FIG. 3, the method includes the following content:

S301. The second cell acquires time-frequency resource information of the second cell, where the time-frequency resource information of the second cell is determined according to relationship information of interference after a multi-standard network controller or a first cell acquires the relationship information of interference imposed on the first cell by the second cell, where the relationship information of interference is used to indicate interference imposed on the first cell by the second cell in a time-frequency domain, and the second cell and the first cell have different standards.

Before S301, the method may further include: sending a time-frequency resource allocation request to the multi-standard network controller or the first cell, where the time-frequency resource request is used to instruct the multi-standard network controller or the first cell to allocate the time-frequency resource information of the second cell to the second cell.

S302. The second cell performs time-frequency resource allocation according to the time-frequency resource information of the second cell.

This embodiment of the present invention provides a resource determining method. A second cell acquires time-frequency resource information of the second cell, where the time-frequency resource information of the second cell is determined according to relationship information of interference after a multi-standard network controller or a first cell acquires the relationship information of interference imposed on the first cell by the second cell, where the relationship information of interference is used to indicate interference imposed on the first cell by the second cell in a time-frequency domain, and the second cell and the first cell have different standards; and performs time-frequency resource allocation according to the time-frequency resource information of the second cell. According to this solution, the second cell acquires the time-frequency resource information of the second cell, and the time-frequency resource information of the second cell is determined according to relationship information of interference from an interfering cell (that is, a second cell) to an interfered cell (that is, a first cell); therefore, interference from the interfering cell to the interfered cell can be reduced after the interfering cell performs time-frequency resource allocation according to the time-frequency resource information.

Embodiment 2

Figure 4:
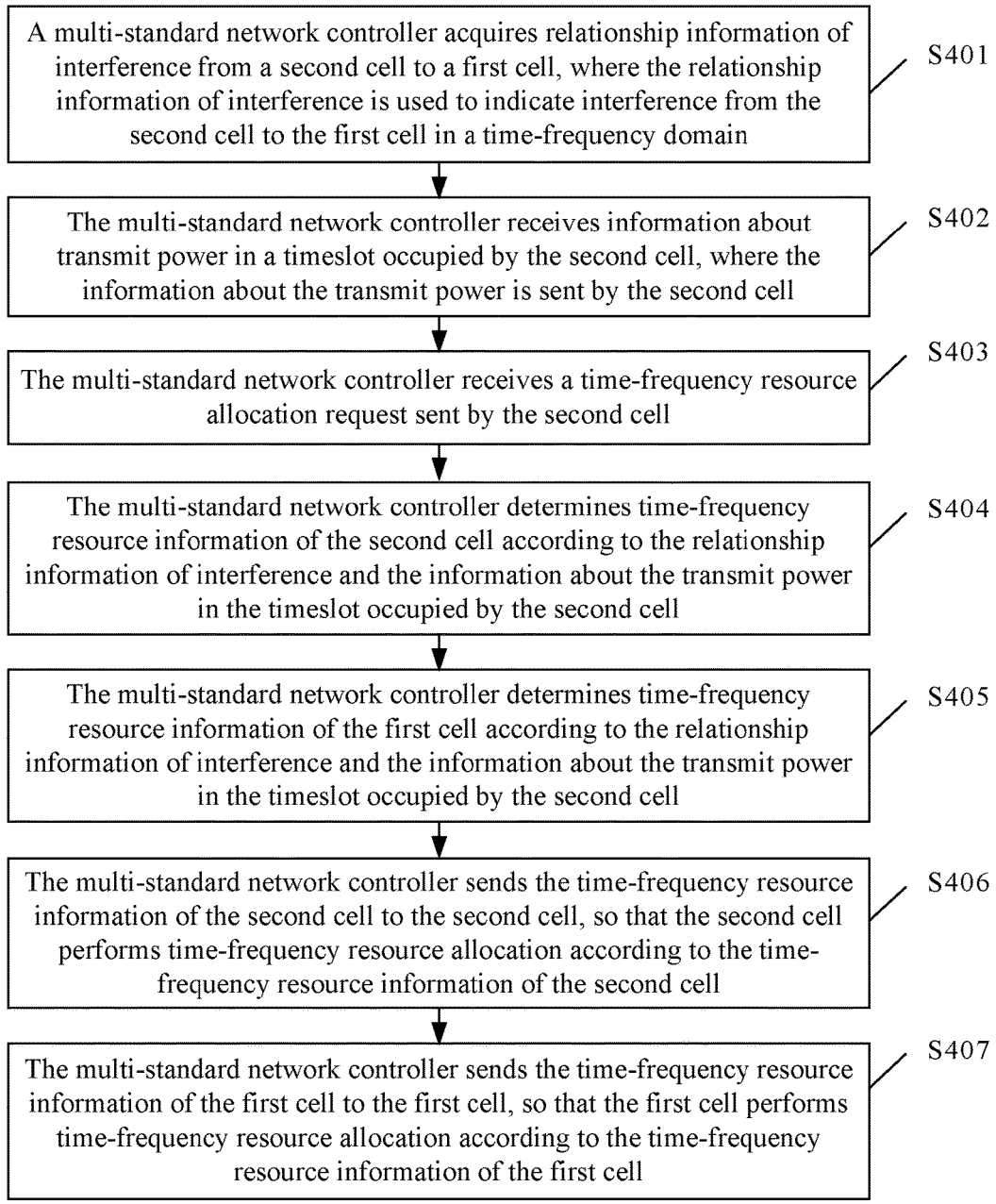
FIG. 4 is a fourth schematic flowchart of a resource determining method according to an embodiment of the present invention.

This embodiment of the present invention provides a resource determining method. As shown in FIG. 4, an example in which a system of a first cell is an LTE system and a system of a second cell is a GSM system is used for detailed description, and the method includes the following content:

S401. A multi-standard network controller acquires relationship information of interference imposed on the first cell by the second cell, where the relationship information of interference is used to indicate interference imposed on the first cell by the second cell in a time-frequency domain.

According to a definition of a radio communication frequency band in the 3rd Generation Partnership Project (3GPP) standards, frequency bands of 900 MHz and 1800 MHz are mainly used in a GSM. With gradual popularization of a 3rd generation mobile communications technology (3G) service and migration of users, the 3G service is mainly carried in a frequency band of 2.1 GHz, and therefore, load of frequency bands of GSM 900 and GSM 1800 in the GSM system is gradually alleviated. Wireless spectrum resources of the frequency bands of GSM 900 and GSM 1800 in the GSM system may be gradually applied to a more advanced and more efficient LTE network, that is, spectrum resource sharing is implemented between the GSM system and the LTE system.

In this case, transmit power in the GSM system is quite high, where transmit power of a carrier is 20 W approximately; transmit power in an LTE system is lower, where transmit power of a PRB is 0.8 W approximately. Therefore, when the first cell and the second cell share a spectrum resource, the second cell severely interferes with the first cell, and a result caused by this problem may be that neither the first cell nor the second cell can perform service transmission. In the resource determining method provided in this embodiment of the present invention, an objective is to reduce co-channel interference between systems of different standards that share a wireless spectrum resource.

It should be noted that, in this embodiment of the present invention, a cell (the first cell) of the LTE system may share an entire wireless spectrum resource of the GSM system, and transmit power in a cell of the GSM system is generally far greater than that in a cell of the LTE system; therefore, the cell of the GSM system may severely interfere with the cell of the LTE system.

Figure 5:
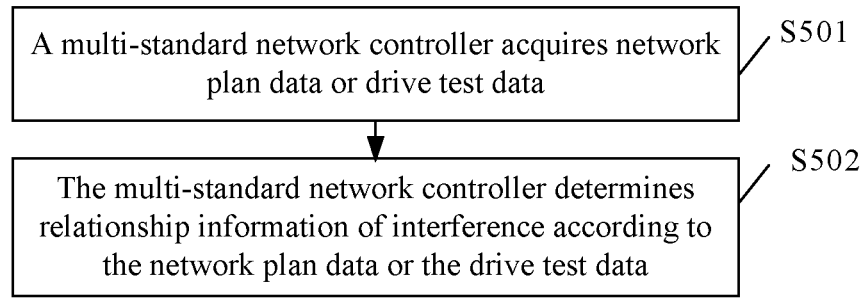
FIG. 5 is a fifth schematic flowchart of a resource determining method according to an embodiment of the present invention.

Specifically, a method for acquiring, by a multi-standard network controller, relationship information of interference imposed on the first cell by the second cell in S401 includes at least one or two of the following:

As shown in FIG. 5, a first method specifically includes the following content:

S501. The multi-standard network controller acquires network plan data or drive test data.

The network plan data may specifically include location information of the first cell and location information of the second cell, and the drive test data may specifically include strength of a signal that is of the second cell and is received by a drive test terminal within the first cell.

S502. The multi-standard network controller determines the relationship information of interference according to the network plan data or the drive test data.

Figure 6:
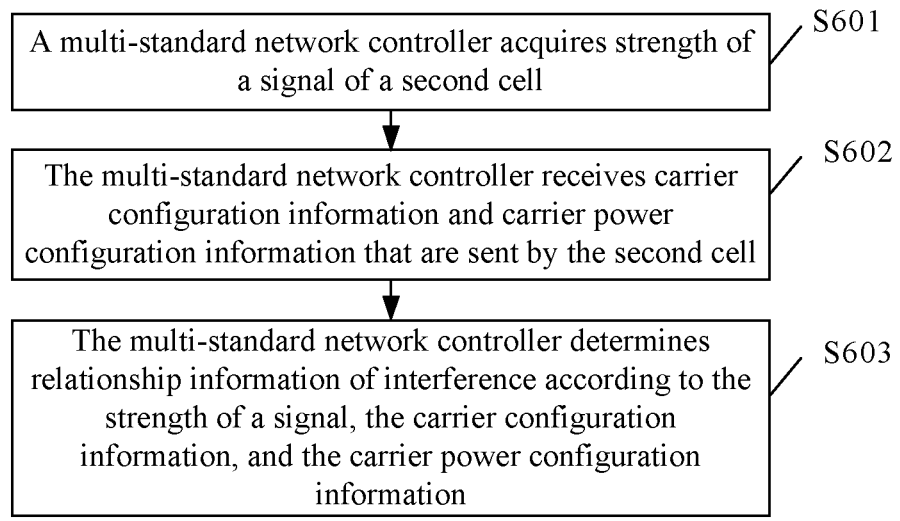
FIG. 6 is a sixth schematic flowchart of a resource determining method according to an embodiment of the present invention.

As shown in FIG. 6, a second method specifically includes the following content:

S601. The multi-standard network controller acquires strength of a signal of the second cell.

A method for acquiring, by the multi-standard network controller, strength of a signal of the second cell includes at least one or two of the following:

(1) The multi-standard network controller receives the strength, sent by the first cell, of the signal of the second cell, where after the first cell sends a first measurement instruction to first user equipment, the first user equipment returns the strength of a signal that is of the second cell and corresponding to the first measurement instruction to the first cell.

It should be noted that a serving cell of the first user equipment in this solution is the first cell, the second cell is a non-serving cell of the first user equipment; however, the first user equipment is located in coverage of the second cell, and the first user equipment can obtain, by means of listening, the strength of a signal of the second cell.

(2) The multi-standard network controller receives the strength of a signal that is of the second cell and sent by the second cell, where after the second cell sends a second measurement instruction to second user equipment, the second user equipment returns the strength of a signal that is of the second cell and corresponding to the second measurement instruction to the second cell.

It should be noted that a condition that this solution can be executed is that the first cell and the second cell are co-site cells. This is because if the first cell and the second cell are co-site cells, the first cell and the second cell may collectively use a facility such as a tower or an antenna feeder, which reduces an investment cost and a maintenance cost. A person skilled in the art may understand that "co-site" refers to sharing of a same geographic location and a same tower.

S602. The multi-standard network controller receives carrier configuration information and carrier power configuration information that are sent by the second cell.

The carrier configuration information includes information used to indicate a carrier configured for the second cell, and the carrier power configuration information includes information used to indicate transmit power of the carrier configured for the second cell.

S603. The multi-standard network controller determines the relationship information of interference according to the strength of a signal, the carrier configuration information, and the carrier power configuration information.

Figure 7:
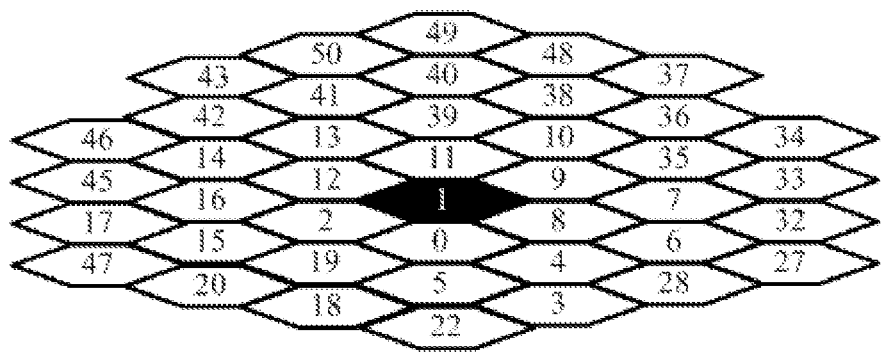
FIG. 7 is a schematic structural diagram of an interference relationship between a GSM and an LTE system that share a wireless spectrum resource.

For example, as shown in FIG. 7, FIG. 7 is a structural diagram of an interference relationship between a GSM and an LTE system that share a wireless spectrum resource. It is assumed that co-channel spectrum resources of the GSM system and the LTE are an area 1, an area 4, an area 7, an area 10, an area 13, an area 16, an area 19, an area 22, an area 27, an area 34, an area 37, an area 40, an area 43, an area 46, and an area 47; then, an example in which a spectrum resource used by the first cell is the area 1 is used. According to the foregoing various methods for acquiring the relationship information of interference, the multi-standard network controller determines that in addition to being interfered by an intra-frequency LTE cell, the first cell is interfered with different strength by an intra-frequency GSM cell. The area 1 is interfered strongest, and corresponding interference strength of the area 1 is within [−30 dBm, −70 dBm]; the area 4, the area 7, the area 10, the area 13, the area 16, the area 19, and the area 22 are interfered second strongest, and corresponding interference strength of the area 4, the area 7, the area 10, the area 13, the area 16, the area 19, and the area 22 is within [−85 dBm, −95 dBm]; the area 27, the area 34, the area 37, the area 40, the area 43, the area 46, and the area 47 are interfered weakly, and corresponding interference strength of the area 27, the area 34, the area 37, the area 40, the area 43, the area 46, and the area 47 is within [−100 dBm, −110 dBm].

Further, the multi-standard network controller may further receive the carrier configuration information and the carrier power configuration information that are of the second cell. For example, carriers f0, f3, and f6 are configured for the second cell, where f0 is a carrier used for signal measurement, and transmit power of f0, f3, and f6 is all 20 W; in this case, the multi-standard network controller can determine the relationship information of interference by using the carrier configuration information and the carrier power configuration information. For example, interference strength from the second cell to the first cell on the carriers f0, f3, and f6 is within [−30 dBm, −70 dBm], or in consideration that transmit power is 43 dBm, a path loss from the second cell to the first cell on the carriers f0, f3, and f6 is within [−73 dB, −113 dB].

In conclusion, the multi-standard network controller may determine the relationship information of interference according to the strength of a signal, the carrier configuration information, and the carrier power configuration information. The relationship information of interference includes strength information of interference imposed on the first cell by the second cell, or information about a path loss from the second cell to the first cell.

S402. The multi-standard network controller receives information about transmit power in a timeslot occupied by the second cell, where the information about the transmit power is sent by the second cell.

Corresponding to the foregoing example, the second cell may send, to the multi-standard network controller, the information about the transmit power in the timeslot occupied by the second cell, where the information about the transmit power includes that "on a carrier f0 of the second cell, transmit power corresponding to a timeslot (slot) 0 is 20 W, transmit power corresponding to a slot 1 is 10 W, transmit power corresponding to a slot 2 is 1 W, and transmit power corresponding to another slot that is not allocated is 0", so that the multi-standard network controller can determine time-frequency resource information of the second cell and time-frequency resource information of the first cell more accurately in subsequent steps. Therefore, it should be additionally noted that S402 is an optional step.

S403. The multi-standard network controller receives a time-frequency resource allocation request sent by the second cell.

As a service of the second cell changes, for example, for a service request of a new user, the second cell may send the time-frequency resource allocation request to the multi-standard network controller.

For example, carriers allocated to the second cell are f0, f3, and f6, where a user currently uses f0, there is no service on other carriers, and the service request of the new user currently needs to occupy a new carrier; in this case, the second cell sends the time-frequency resource allocation request to the multi-standard network controller.

Specifically, the time-frequency resource allocation request may be carrier allocation request information or timeslot allocation request information. The carrier allocation request information is used to request the multi-standard network controller to allocate a carrier to the second cell. Compared with the carrier allocation request information, the timeslot allocation request information is more specific, that is, the timeslot allocation request information is used to request the multi-standard network controller to allocate a timeslot in the carrier to the second cell.

S404. The multi-standard network controller determines time-frequency resource information of the second cell according to the relationship information of interference and the information about the transmit power in the timeslot occupied by the second cell.

The determining, by the multi-standard network controller, time-frequency resource information of the second cell according to the relationship information of interference and the information about the transmit power in the timeslot occupied by the second cell specifically includes: aligning a time-frequency resource of the second cell with a time-frequency resource of the first cell according to the relationship information of interference and the information about the transmit power in the timeslot occupied by the second cell, and further generating the time-frequency resource information of the second cell, where the time-frequency resource of the second cell includes a time resource and/or a frequency resource.

A method for how the multi-standard network controller determines the time-frequency resource information of the second cell according to different information in the relationship information of interference is described in detail in the following:

(1) The multi-standard network controller determines the time-frequency resource information of the second cell according to the strength of a signal of the second cell in the relationship information of interference.

Specifically, corresponding to the foregoing example, a carrier of the second cell includes a time resource and a frequency resource, a PRB of the first cell also includes a time resource and a frequency resource. After the carrier of the second cell is aligned with the PRB of the first cell, the multi-standard network controller determines, according to interference, at different degrees, from the GSM system to the first cell in an interference relationship, that interference from the GSM system to the first cell of the LTE system on a PRB4 (which is corresponding to f3 after the aligning) is stronger, and interference from the GSM system on a PRB7 (which is corresponding to f6 after aligning) is weaker. In this case, to reserve f6 for the first cell of an LTE system standard, the multi-standard network controller decides to make the GSM system choose f3 for centralized interference. The aligning in this embodiment of the present invention refers to alignment of a start position of a time frame or a frequency frame.

(2) The multi-standard network controller determines the time-frequency resource information of the second cell according to the information about the path loss from the second cell to the first cell in the relationship information of interference.

Corresponding to the foregoing example, for example, strength of a signal from the second cell to the first cell on the carriers f0, f3, and f6 is within [−30 dBm, −70 dBm], or in consideration that transmit power is 43 dBm, a path loss from the second cell to the first cell on the carriers f0, f3, and f6 is within [−73 dB, −113 dB]. In this case, if the information about the path loss indicates that a path loss from the second cell to the first cell is quite large, which indicates that interference imposed on the first cell by the second cell is quite weak, the second cell may use an entire time-frequency resource.

Further, the relationship information of interference may further include strength of a signal that is of the second cell and arrives at the first cell; therefore, the method for determining, by the multi-standard network controller, the time-frequency resource information of the second cell according to different information in the relationship information of interference further includes:

(3) The multi-standard network controller determines the time-frequency resource information of the second cell according to the strength of a signal that is of the second cell and arrives at the first cell in the relationship information of interference.

The strength of a signal that is of the second cell and arrives at the first cell indicates a degree of interference imposed on the first cell by the second cell. If the interference imposed on the first cell by the second cell is quite weak, the second cell may use an entire time-frequency resource; or the relationship information of interference includes strength of relative interference from a signal of the second cell to a signal of the first cell, and if strength of relative interference imposed on the first cell by the second cell is quite small, the second cell may use an entire time-frequency resource.

Further, if the multi-standard network controller determines the time-frequency resource information of the second cell according to the relationship information of interference and the information about the transmit power in the timeslot occupied by the second cell, when determining the time-frequency resource information of the second cell, the multi-standard network controller may determine strength of interference from the timeslot occupied by the second cell to a corresponding time-frequency resource of the first cell; if the interference from the timeslot occupied by the second cell to the corresponding time-frequency resource of the first cell is quite strong, the resource is identified as a strongly interfered resource.

S405. The multi-standard network controller determines time-frequency resource information of the first cell according to the relationship information of interference and the information about the transmit power in the timeslot occupied by the second cell.

The time-frequency resource information of the first cell includes degree information of interference imposed on the first cell by the second cell on a time-frequency resource.

It should be noted that there is no limitation on a time sequence between S404 and S405, that is, S404 may be performed first and then S405 is performed; S405 may be performed first, and then S404 is performed; or S404 and S405 may be performed at the same time, which is not limited in the present invention.

S406. The multi-standard network controller sends the time-frequency resource information of the second cell to the second cell, so that the second cell performs time-frequency resource allocation according to the time-frequency resource information of the second cell.

S407. The multi-standard network controller sends the time-frequency resource information of the first cell to the first cell, so that the first cell performs time-frequency resource allocation according to the time-frequency resource information of the first cell.

Corresponding to the foregoing example, the multi-standard network controller sends time-frequency resource information of a carrier f3 to the second cell, so that the second cell performs time-frequency resource allocation according to the time-frequency resource information; the multi-standard network controller sends resource information of an available resource PRB7 or resource information of an unavailable resource PRB4 to the first cell, so that according to the resource information, the first cell schedules the available resource PRB7, or avoids scheduling the unavailable resource PRB4, or performs scheduling with a lower-order MCS on the unavailable resource PRB4.

Further, the first cell may further configure a second carrier of the first cell according to the time-frequency resource information of the first cell and by using a first carrier of the first cell, where the second carrier is a time-frequency resource shared by the first cell and the second cell.

Specifically, in a time domain, a physical downlink control channel (PDCCH) of the first cell generally occupies first three orthogonal frequency division multiplexing (OFDM) symbols of each timeslot of 1 ms. In a frequency domain, a PDCCH generally occupies all bandwidths. For example, the first cell occupies 10 MHz, and in this case, there are PDCCHs in 50 PRBs. Therefore, even if strong interference to a physical downlink shared channel (PDSCH) on a PRB4 is avoided by means of scheduling, strong interference to a PDCCH on the PRB4 cannot be avoided. Therefore, to avoid strong interference from the second cell to the PDCCH, a method that may be used is cross-carrier scheduling. That is, it is assumed that the first cell works in a multi-carrier mode, and occupies a carrier 1 and a carrier 2 at the same time, where a PDSCH of the carrier 2 may be allocated by using a PDCCH of the carrier 1, that is, the carrier 2 may not have a PDCCH. That is, the first cell described in the foregoing configures the second carrier of the first cell by using the first carrier of the first cell.

It should be noted that there is no limitation on a time sequence between S406 and S407, that is, S406 may be performed first and then S407 is performed; S407 may be performed first, and then S406 is performed; or S406 and S407 may be performed at the same time, which is not limited in the present invention.

This embodiment of the present invention provides a resource determining method. A multi-standard network controller acquires relationship information of interference imposed on a first cell by a second cell, where the relationship information of interference is used to indicate interference imposed on the first cell by the second cell in a time-frequency domain, and the second cell and the first cell have different standards; and determines time-frequency resource information of the second cell according to the relationship information of interference, where the time-frequency resource information of the second cell is used for the second cell to perform time-frequency resource allocation. According to this solution, relationship information of interference from an interfering cell (that is, a second cell) to an interfered cell (that is, a first cell) is acquired, and time-frequency resource information of the interfering cell is determined according to the relationship information of interference; therefore, interference from the interfering cell to the interfered cell can be reduced after the interfering cell performs time-frequency resource allocation according to the time-frequency resource information.

Embodiment 3

Figure 8:
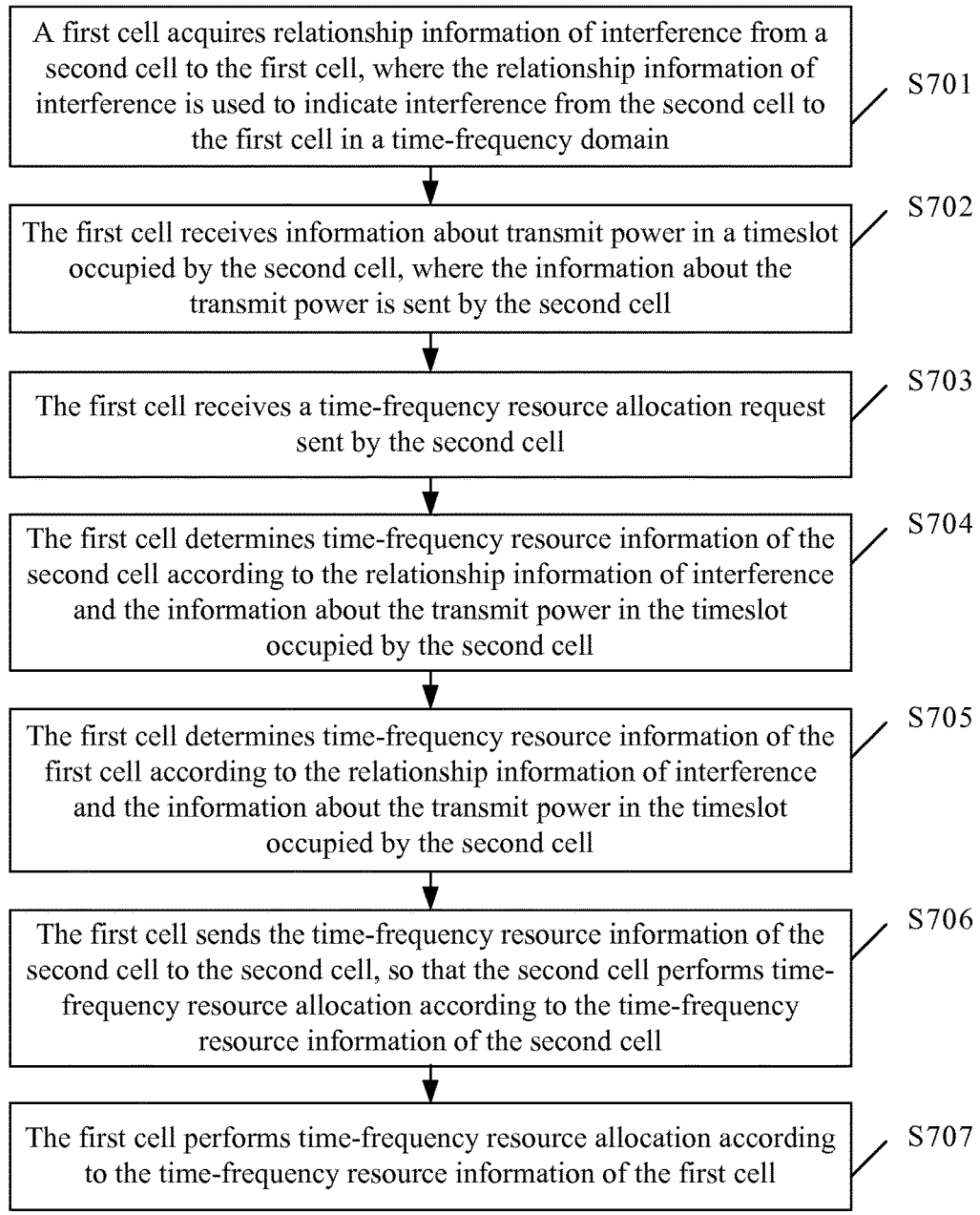
FIG. 8 is a seventh schematic flowchart of a resource determining method according to an embodiment of the present invention.

This embodiment of the present invention provides a resource determining method. As shown in FIG. 8, an example in which a system of a first cell is an LTE system and a system of a second cell is a GSM system is used for detailed description, and the method includes the following content:

S701. The first cell acquires relationship information of interference imposed on the first cell by the second cell, where the relationship information of interference is used to indicate interference imposed on the first cell by the second cell in a time-frequency domain.

According to a definition of a radio communication frequency band in the 3GPP standards, frequency bands of 900 MHz and 1800 MHz are mainly used in the GSM system. With gradual popularization of a 3G service and migration of users, the 3G service is mainly carried on a frequency band of 2.1 GHz, and therefore, load of frequency bands of GSM 900 and GSM 1800 in GSM is gradually alleviated. Wireless spectrum resources of the frequency bands of GSM 900 and GSM 1800 in the GSM system may be gradually applied to a more advanced and more efficient LTE network, that is, spectrum resource sharing is implemented between the GSM system and the LTE system.

In this case, transmit power in the GSM system is quite high, where transmit power of a carrier is 20 W approximately; transmit power in an LTE system is lower, where transmit power of a PRB is 0.8 W approximately. Therefore, when the first cell and the second cell share a spectrum resource, the second cell severely interferes with the first cell, and a result caused by this problem may be that neither the first cell nor the second cell can perform service transmission. In the resource determining method provided in this embodiment of the present invention, an objective is to reduce co-channel interference between systems of different standards that share a wireless spectrum resource.

It should be noted that, in this embodiment of the present invention, the first cell shares an entire wireless spectrum resource of the GSM system, and transmit power in GSM is far greater than that in the LTE system; therefore, interference from the GSM system to the LTE system is a major factor, and interference from the LTE system to the GSM system is not discussed in this embodiment of the present invention.

Figure 9:
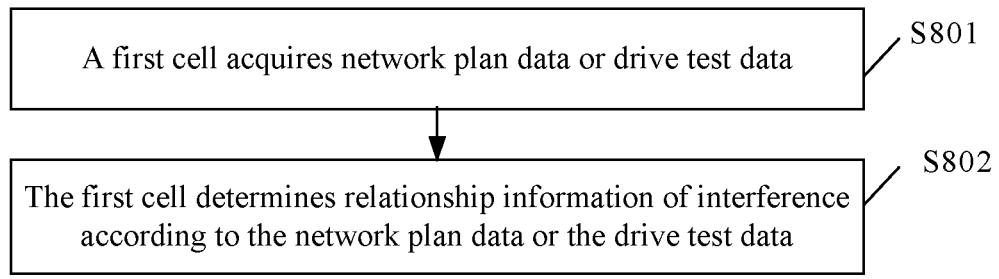
FIG. 9 is an eighth schematic flowchart of a resource determining method according to an embodiment of the present invention.

Specifically, a method for acquiring, by the first cell, relationship information of interference imposed on the first cell by the second cell in S701 includes at least one or two of the following:

As shown in FIG. 9, a first method specifically includes the following content:

S801. The first cell acquires network plan data or drive test data.

The network plan data may specifically include location information of the first cell and location information of the second cell, and the drive test data may specifically include strength of a signal that is of the second cell and is received by a drive test terminal within the first cell.

S802. The first cell determines the relationship information of interference according to the network plan data or the drive test data.

Figure 10:
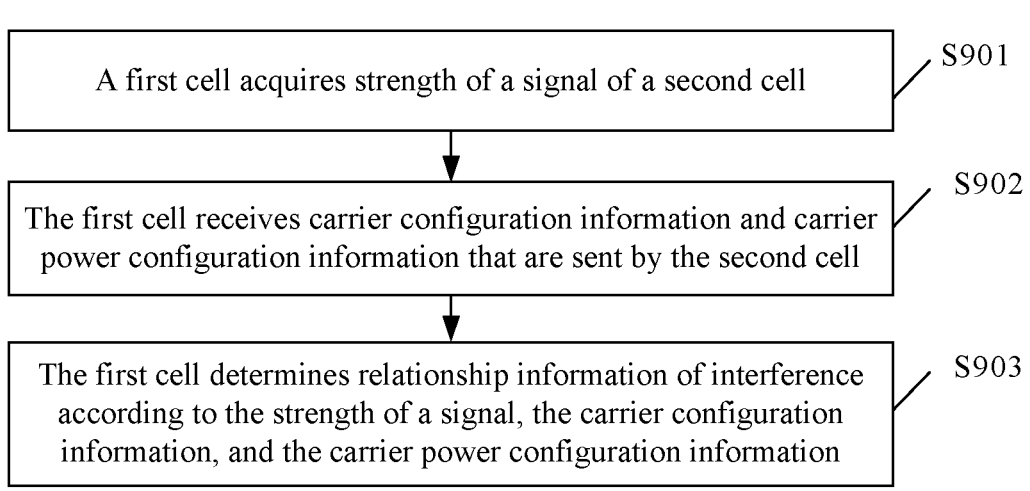
FIG. 10 is a ninth schematic flowchart of a resource determining method according to an embodiment of the present invention.

As shown in FIG. 10, a second method specifically includes the following content:

S901. The first cell acquires strength of a signal of the second cell.

A method for acquiring, by the first cell, strength of a signal of the second cell includes at least one or two of the following:

(1) The first cell sends a first measurement instruction to first user equipment, and the first user equipment returns the strength of a signal that is of the second cell and corresponding to the first measurement instruction to the first cell.

It should be noted that a serving cell of the first user equipment in this solution is the first cell, the second cell is a non-serving cell of the first user equipment; however, the first user equipment is located in coverage of the second cell, and the first user equipment can obtain, by means of listening, the strength of a signal of the second cell.

(2) The first cell receives the strength of a signal that is of the second cell and sent by the second cell, where the strength of a signal of the second cell is that after the second cell sends a second measurement instruction to second user equipment, the second user equipment returns the strength of a signal that is of the second cell and corresponding to the second measurement instruction to the second cell.

It should be noted that a condition that this solution can be executed is that the first cell and the second cell are co-site cells. This is because if the first cell and the second cell are co-site cells, the first cell and the second cell may collectively use a facility such as a tower or an antenna feeder, which reduces an investment cost and a maintenance cost.

S902. The first cell receives carrier configuration information and carrier power configuration information that are sent by the second cell.

The carrier configuration information includes information used to indicate a carrier configured for the second cell, and the carrier power configuration information includes information used to indicate transmit power of the carrier configured for the second cell.

S903. The first cell determines the relationship information of interference according to the strength of a signal, the carrier configuration information, and the carrier power configuration information.

FIG. 7 is still used as an example. It is assumed that co-channel spectrum resources of the GSM system and the LTE are an area 1, an area 4, an area 7, an area 10, an area 13, an area 16, an area 19, an area 22, an area 27, an area 34, an area 37, an area 40, an area 43, an area 46, and an area 47; then, an example in which a spectrum resource used by the first cell of the LTE is the area 1 is used. According to the foregoing various methods for acquiring the relationship information of interference, the first cell determines that in addition to being interfered by an intra-frequency LTE cell, the first cell is interfered with different strength by an intra-frequency GSM cell. The area 1 is interfered strongest, and corresponding interference strength of the area 1 is within [−30 dBm, −70 dBm]; the area 4, the area 7, the area 10, the area 13, the area 16, the area 19, and the area 22 are interfered second strongest, and corresponding interference strength of the area 4, the area 7, the area 10, the area 13, the area 16, the area 19, and the area 22 is within [−85 dBm, −95 dBm]; the area 27, the area 34, the area 37, the area 40, the area 43, the area 46, and the area 47 are interfered weakly, and corresponding interference strength of the area 27, the area 34, the area 37, the area 40, the area 43, the area 46, and the area 47 is within [−100 dBm, −110 dBm].

Further, the first cell may further receive the carrier configuration information and the carrier power configuration information that are of the second cell. For example, carriers f0, f3, and f6 are configured for the second cell, where f0 is a carrier used for signal measurement, and transmit power of f0, f3, and f6 is all 20 W; in this case, the first cell may determine the relationship information of interference by using the carrier configuration information and the carrier power configuration information. For example, strength of a signal from the second cell to the first cell on the carriers f0, f3, and f6 is within [−30 dBm, −70 dBm], or in consideration that transmit power is 43 dBm, a path loss from the second cell to the first cell on the carriers f0, f3, and f6 is within [−73 dB, −113 dB].

In conclusion, the first cell may determine the relationship information of interference according to the strength of a signal, the carrier configuration information, and the carrier power configuration information. The relationship information of interference includes strength information of interference imposed on the first cell by the second cell, or information about a path loss from the second cell to the first cell.

S702. The first cell receives information about transmit power in a timeslot occupied by the second cell, where the information about the transmit power is sent by the second cell.

Corresponding to the foregoing example, the second cell may send, to the first cell, the information about the transmit power in the timeslot occupied by the second cell, where the information about the transmit power includes that "on a carrier f0 of the second cell, transmit power corresponding to a timeslot (slot) 0 is 20 W, transmit power corresponding to a slot 1 is 10 W, transmit power corresponding to a slot 2 is 1 W, and transmit power corresponding to another slot that is not allocated is 0", so that the first cell can determine time-frequency resource information of the second cell and time-frequency resource information of the first cell more accurately in subsequent steps. Therefore, it should be additionally noted that S702 is an optional step.

S703. The first cell receives a time-frequency resource allocation request sent by the second cell.

As a service of the second cell changes, for example, for a service request of a new user, the second cell may send the time-frequency resource allocation request to the first cell.

For example, carriers allocated to the second cell are f0, f3, and f6, where a user currently uses f0, there is no service on other carriers, and the service request of the new user currently needs to occupy a new carrier; in this case, the second cell sends the time-frequency resource allocation request to the first cell.

Specifically, the time-frequency resource allocation request may be carrier allocation request information or timeslot allocation request information. The carrier allocation request information is used to request the first cell to allocate a carrier to the second cell. Compared with the carrier allocation request information, the timeslot allocation request information is more specific, that is, the timeslot allocation request information is used to request the first cell to allocate a timeslot in the carrier to the second cell.

S704. The first cell determines time-frequency resource information of the second cell according to the relationship information of interference and the information about the transmit power in the timeslot occupied by the second cell.

The determining, by the first cell, time-frequency resource information of the second cell according to the relationship information of interference and the information about the transmit power in the timeslot occupied by the second cell specifically includes: aligning a time-frequency resource of the second cell with a time-frequency resource of the first cell according to the relationship information of interference and the information about the transmit power in the timeslot occupied by the second cell, and further generating the time-frequency resource information of the second cell, where the time-frequency resource of the second cell includes a time resource and/or a frequency resource.

A method for determining, by the first cell, the time-frequency resource information of the second cell according to different information in the relationship information of interference is described in detail in the following:

(1) The first cell determines the time-frequency resource information of the second cell according to the strength of a signal of the second cell in the relationship information of interference.

Specifically, corresponding to the foregoing example, a carrier of the second cell includes time resource and frequency resource, a PRB of the first cell also includes time resource and frequency resource. After the carrier of the second cell is aligned with the PRB of the first cell, the first cell determines, according to interference, at different degrees, from the GSM system to the first cell of the LTE in an interference relationship, that interference from the GSM system to the first cell of the LTE on a PRB4 (which is corresponding to f3 after the aligning) is stronger, and interference from the GSM system on a PRB7 (which is corresponding to f6 after aligning) is weaker. In this case, to reserve f6 for the first cell of the LTE, the first cell decides to make GSM choose f3 for centralized interference.

(2) The first cell determines the time-frequency resource information of the second cell according to the information about the path loss from the second cell to the first cell in the relationship information of interference.

Corresponding to the foregoing example, for example, strength of a signal from the second cell to the first cell on the carriers f0, f3, and f6 is within [−30 dBm, −70 dBm], or in consideration that transmit power is 43 dBm, a path loss from the second cell to the first cell on the carriers f0, f3, and f6 is within [−73 dB, −113 dB]. In this case, if the information about the path loss indicates that a path loss from the second cell to the first cell is quite large, which indicates that interference imposed on the first cell by the second cell is quite weak, the second cell may use an entire time-frequency resource.

Further, the relationship information of interference may further include strength of a signal that is of the second cell and arrives at the first cell; therefore, the method for determining, by the first cell, the time-frequency resource information of the second cell according to different information in the relationship information of interference further includes:

(3) Determine the time-frequency resource information of the second cell according to the strength of a signal that is of the second cell and arrives at the first cell in the relationship information of interference.

The strength of a signal that is of the second cell and arrives at the first cell indicates a degree of interference imposed on the first cell by the second cell. If the interference imposed on the first cell by the second cell is quite weak, the second cell may use an entire time-frequency resource; or the relationship information of interference includes strength of relative interference from a signal of the second cell to a signal of the first cell, and if strength of relative interference imposed on the first cell by the second cell is quite small, the second cell may use an entire time-frequency resource.

Further, if the first cell determines the time-frequency resource information of the second cell according to the relationship information of interference and the information about the transmit power in the timeslot occupied by the second cell, when determining the time-frequency resource information of the second cell, the first cell may determine strength of interference from the timeslot occupied by the second cell to a corresponding time-frequency resource of the first cell; if the interference from the timeslot occupied by the second cell to the corresponding time-frequency resource of the first cell is quite strong, the resource is identified as a strongly interfered resource.

S705. The first cell determines time-frequency resource information of the first cell according to the relationship information of interference and the information about the transmit power in the timeslot occupied by the second cell.

The time-frequency resource information of the first cell includes degree information of interference imposed on the first cell by the second cell on a time-frequency resource.

It should be noted that there is no limitation on a time sequence between S704 and S705, that is, S704 may be performed first and then S705 is performed; S705 may be performed first, and then S704 is performed; or S704 and S705 may be performed at the same time, which is not limited in the present invention.

S706. The first cell sends the time-frequency resource information of the second cell to the second cell, so that the second cell performs time-frequency resource allocation according to the time-frequency resource information of the second cell.

S707. The first cell performs time-frequency resource allocation according to the time-frequency resource information of the first cell.

Corresponding to the foregoing example, the first cell sends time-frequency resource information of a carrier f3 to the second cell, so that the second cell performs time-frequency resource allocation according to the time-frequency resource information; the first cell determines resource information of an available resource PRB7 or resource information of an unavailable resource PRB4, and according to the resource information, the first cell schedules the available resource PRB7, or avoids scheduling the unavailable resource PRB4, or performs scheduling with a lower-order MCS on the unavailable resource PRB4.

Further, the first cell may further configure a second carrier of the first cell according to the time-frequency resource information of the first cell and by using a first carrier of the first cell, where the second carrier is a time-frequency resource shared by the first cell and the second cell.

Specifically, in a time domain, a PDCCH of the first cell generally occupies first three OFDM symbols of each timeslot of 1 ms. In a frequency domain, a PDCCH generally occupies all bandwidths. For example, the first cell occupies 10 MHz, and in this case, there are PDCCHs in 50 PRBs.

Therefore, even if strong interference to a PDSCH on a PRB4 is avoided by means of scheduling, strong interference to a PDCCH on the PRB4 cannot be avoided. Therefore, to avoid strong interference from the second cell to the PDCCH, a method that may be used is cross-carrier scheduling. That is, it is assumed that the first cell works in a multi-carrier mode, and occupies a carrier 1 and a carrier 2 at the same time, where a PDSCH of the carrier 2 may be allocated by using a PDCCH of the carrier 1, that is, the carrier 2 may not have a PDCCH. That is, the first cell described in the foregoing configures the second carrier of the first cell by using the first carrier of the first cell.

It should be noted that there is no limitation on a time sequence between S706 and S707, that is, S706 may be performed first and then S707 is performed; S707 may be performed first, and then S706 is performed; or S706 and S707 may be performed at the same time, which is not limited in the present invention.

This embodiment of the present invention provides a resource determining method. A first cell acquires time-frequency resource information of the first cell, where the time-frequency resource information of the first cell is used for the first cell to perform time-frequency resource allocation; and performs time-frequency resource allocation according to the time-frequency resource information of the first cell. According to this solution, the time-frequency resource information of the first cell is acquired, and the time-frequency resource of the first cell is determined according to relationship information of interference from an interfering cell (that is, a second cell) to an interfered cell (that is, a first cell); therefore, interference from the interfering cell to the interfered cell can be reduced after the interfered cell performs time-frequency resource allocation according to the time-frequency resource information.

Embodiment 4

Figure 11:
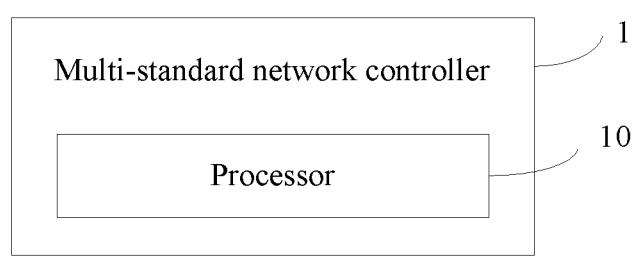
FIG. 11 is a first schematic structural diagram of a multi-standard network controller according to an embodiment of the present invention.

As shown in FIG. 11, this embodiment of the present invention provides a multi-standard network controller 1, including:

a processor 10, configured to: acquire relationship information of interference imposed on a first cell by a second cell, where the relationship information of interference is used to indicate interference imposed on the first cell by the second cell in a time-frequency domain, and the second cell and the first cell have different standards; and determine time-frequency resource information of the second cell according to the relationship information of interference, where the time-frequency resource information of the second cell is used for the second cell to perform time-frequency resource allocation.

Further, the relationship information of interference acquired by the processor 10 includes strength of a signal of the second cell, strength information of interference from a signal of the second cell to a signal of the first cell, or information about a path loss from the second cell to the first cell.

Specifically, the processor 10 is specifically configured to: if a time-frequency resource allocation request sent by the second cell is received, allocate the time-frequency resource information of the second cell according to the relationship information of interference.

Further, the processor 10 is further configured to determine time-frequency resource information of the first cell according to the relationship information of interference, where the time-frequency resource information of the first cell is used for the first cell to perform time-frequency resource allocation.

Specifically, the processor 10 is configured to: acquire network plan data or drive test data, where the network plan data includes location information of the first cell and location information of the second cell, and the drive test data includes strength of a signal that is of the second cell and is received by a drive test terminal within the first cell; and determine the relationship information of interference according to the network plan data or the drive test data; or the processor 10 may be configured to: acquire strength of a signal of the second cell and carrier configuration information of the second cell, and determine the relationship information of interference according to the strength of a signal and the carrier configuration information.

Figure 12:
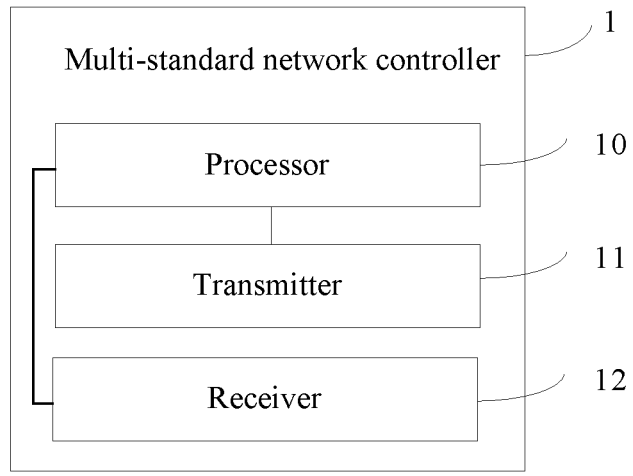
FIG. 12 is a second schematic structural diagram of a multi-standard network controller according to an embodiment of the present invention.

Further, as shown in FIG. 12, the multi-standard network controller 1 further includes a transmitter 11 and a receiver 12.

The transmitter 11 is configured to send a first measurement instruction to first user equipment, where the first measurement instruction is used to instruct the first user equipment to measure the strength of a signal of the second cell.

The receiver 12 is configured to receive the strength, sent by the first user equipment, of the signal of the second cell.

Further, the processor 10 is configured to determine the relationship information of interference according to the strength of a signal of the second cell, the carrier configuration information of the second cell, and carrier power configuration information of the second cell.

The carrier configuration information includes information used to indicate a carrier configured for the second cell, and the carrier power configuration information includes information used to indicate transmit power of the carrier configured for the second cell.

Further, the processor 10 is configured to determine the time-frequency resource information of the second cell according to the relationship information of interference and information about transmit power in a timeslot occupied by the second cell.

The time-frequency resource information of the second cell includes carrier configuration information or timeslot configuration information.

Further, the time-frequency resource information of the first cell includes information used to indicate a time-frequency resource that the first cell avoids scheduling, or information used to indicate a time-frequency resource on which the first cell performs scheduling with a lower-order modulation and coding scheme MCS in a time-frequency domain.

This embodiment of the present invention provides a multi-standard network controller. Relationship information of interference imposed on a first cell by a second cell is acquired, where the relationship information of interference is used to indicate interference imposed on the first cell by the second cell in a time-frequency domain, and the second cell and the first cell have different standards; and time-frequency resource information of the second cell is determined according to the relationship information of interference, where the time-frequency resource information of the second cell is used for the second cell to perform time-frequency resource allocation. According to this solution, relationship information of interference from an interfering cell (that is, a second cell) to an interfered cell (that is, a first cell) is acquired, and time-frequency resource information of the interfering cell is determined according to the relationship information of interference; therefore, interference from the interfering cell to the interfered cell can be reduced after the interfering cell performs time-frequency resource allocation according to the time-frequency resource information.

Embodiment 5

Figure 13:
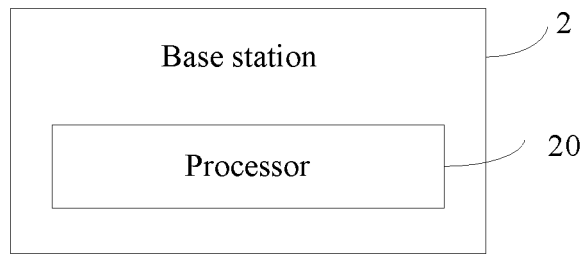
FIG. 13 is a first schematic structural diagram of a base station according to an embodiment of the present invention.

As shown in FIG. 13, this embodiment of the present invention provides a base station 2, including:
- a processor 20, configured to: acquire time-frequency resource information of a first cell, where the time-frequency resource information of the first cell is used for the first cell to perform time-frequency resource allocation; and perform time-frequency resource allocation according to the time-frequency resource information of the first cell.

Figure 14:
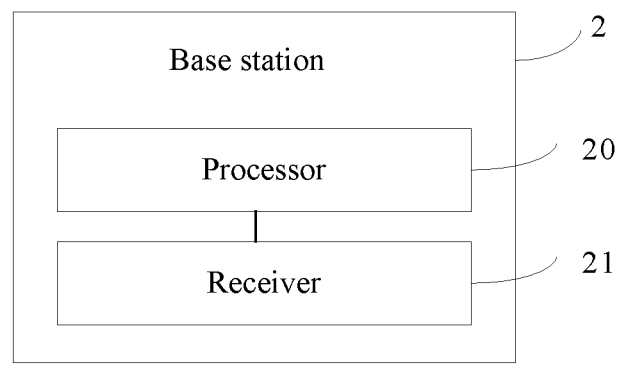
FIG. 14 is a second schematic structural diagram of a base station according to an embodiment of the present invention.

Further, as shown in FIG. 14, the base station 2 further includes:
- a receiver 21, configured to: receive time-frequency resource information that is of the first cell and sent by a multi-standard network controller, where the time-frequency resource information of the first cell is sent by the multi-standard network controller to the first cell after the multi-standard network controller acquires relationship information of interference from a second cell to the first cell and determines the time-frequency resource information of the first cell according to the relationship information of interference, where the relationship information of interference is used to indicate interference imposed on the first cell by the second cell in a time-frequency domain, and the second cell and the first cell have different standards.

Specifically, the processor 20 is specifically configured to: acquire the relationship information of interference imposed on the first cell by the second cell, where the relationship information of interference is used to indicate interference imposed on the first cell by the second cell in the time domain and the frequency domain, and the second cell and the first cell have different standards; and determine the time-frequency resource information of the first cell according to the relationship information of interference to the first cell; or the processor 20 is specifically configured to configure a second carrier of the first cell according to the time-frequency resource information of the first cell and by using a first carrier of the first cell, where the second carrier includes a time-frequency resource shared by the first cell and the second cell.

This embodiment of the present invention provides a base station. Time-frequency resource information of a first cell is acquired, where the time-frequency resource information of the first cell is used for the first cell to perform time-frequency resource allocation; and time-frequency resource allocation is performed according to the time-frequency resource information of the first cell. According to this solution, the time-frequency resource information of the first cell is acquired, and the time-frequency resource information of the first cell is determined according to relationship information of interference from an interfering cell (that is, a second cell) to an interfered cell (that is, a first cell); therefore, interference from the interfering cell to the interfered cell can be reduced after the interfered cell performs time-frequency resource allocation according to the time-frequency resource information.

Embodiment 6

Figure 15:
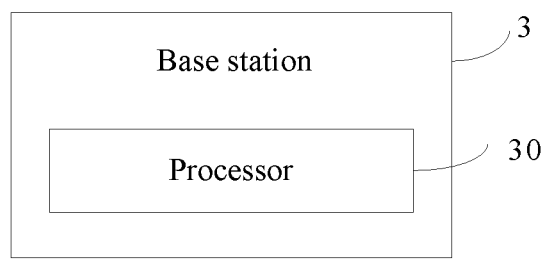
FIG. 15 is a first schematic structural diagram of another base station according to an embodiment of the present invention.

As shown in FIG. 15, this embodiment of the present invention provides a base station 3, including:
- a processor 30, configured to: acquire time-frequency resource information of a second cell, where the time-frequency resource information of the second cell is determined according to relationship information of interference after a multi-standard network controller or a first cell acquires the relationship information of interference imposed on the first cell by the second cell, where the relationship information of interference is used to indicate interference imposed on the first cell by the second cell in a time-frequency domain, and the second cell and the first cell have different standards; and perform time-frequency resource allocation according to the time-frequency resource information of the second cell.

Figure 16:
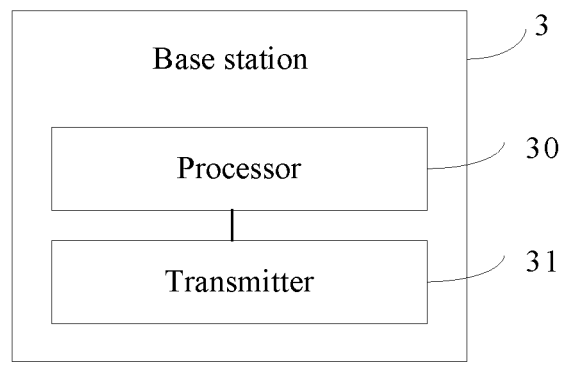
FIG. 16 is a second schematic structural diagram of another base station according to an embodiment of the present invention.

Further, as shown in FIG. 16, the base station 3 further includes:
- a transmitter 31, configured to send a time-frequency resource allocation request to the multi-standard network controller or the first cell, where the time-frequency resource request is used to instruct the multi-standard network controller or the first cell to allocate the time-frequency resource information of the second cell to the second cell.

This embodiment of the present invention provides a base station. Time-frequency resource information of a second cell is acquired, where the time-frequency resource information of the second cell is determined according to relationship information of interference after a multi-standard network controller or a first cell acquires the relationship information of interference imposed on the first cell by the second cell, where the relationship information of interference is used to indicate interference imposed on the first cell by the second cell in a time-frequency domain, and the second cell and the first cell have different standards; and time-frequency resource allocation is performed according to the time-frequency resource information of the second cell. According to this solution, the second cell acquires the time-frequency resource information of the second cell, and the time-frequency resource information of the second cell is determined according to relationship information of interference from an interfering cell (that is, a second cell) to an interfered cell (that is, a first cell); therefore, interference from the interfering cell to the interfered cell can be reduced after the interfering cell performs time-frequency resource allocation according to the time-frequency resource information.

Embodiment 7

This embodiment of the present invention provides a communications system, and the system includes: a multi-standard network controller, a first cell, and a second cell, where the multi-standard network controller is configured to: acquire relationship information of interference imposed on the first cell by the second cell, where the relationship information of interference is used to indicate interference imposed on the first cell by the second cell in a time-frequency domain; receive information about transmit power in a timeslot occupied by the second cell, where the information about the transmit power is sent by the second cell; receive a time-frequency resource allocation request sent by the second cell; determine time-frequency resource information of the second cell according to the relationship information of interference and the information about the transmit power in the timeslot occupied by the second cell; determine time-frequency resource information of the first cell according to the relationship information of interference and the information about the transmit power in the timeslot occupied by the second cell; send the time-frequency resource information of the second cell to the second cell, so that the second cell performs time-frequency resource allocation according to the time-frequency resource information of the second cell; and send the time-frequency resource information of the first cell to the first cell, so that the first cell performs time-frequency resource allocation according to the time-frequency resource information of the first cell;

the first cell is configured to: receive the time-frequency resource information that is of the first cell and sent by the multi-standard network controller; and perform time-frequency resource allocation according to the time-frequency resource information of the first cell; and the second cell is configured to: send the time-frequency resource allocation request to the multi-standard network controller; receive the time-frequency resource information that is of the second cell and sent by the multi-standard network controller; and perform time-frequency resource allocation according to the time-frequency resource information of the second cell.

This embodiment of the present invention provides a communications system. A multi-standard network controller acquires relationship information of interference imposed on a first cell by a second cell, where the relationship information of interference is used to indicate interference imposed on the first cell by the second cell in a time-frequency domain, and the second cell and the first cell have different standards; and determines time-frequency resource information of the second cell according to the relationship information of interference, where the time-frequency resource information of the second cell is used for the second cell to perform time-frequency resource allocation. According to this solution, relationship information of interference from an interfering cell (that is, a second cell) to an interfered cell (that is, a first cell) is acquired, and time-frequency resource information of the interfering cell is determined according to the relationship information of interference; therefore, interference from the interfering cell to the interfered cell can be reduced after the interfering cell performs time-frequency resource allocation according to the time-frequency resource information.

Embodiment 8

This embodiment of the present invention provides a communications system, and the system includes a first cell and a second cell, where the first cell is configured to: acquire relationship information of interference imposed on the first cell by the second cell, where the relationship information of interference is used to indicate interference imposed on the first cell by the second cell in a time-frequency domain; receive information about transmit power in a timeslot occupied by the second cell, where the information about the transmit power is sent by the second cell; receive a time-frequency resource allocation request sent by the second cell; determine time-frequency resource information of the second cell according to the relationship information of interference and the information about the transmit power in the timeslot occupied by the second cell; determine time-frequency resource information of the first cell according to the relationship information of interference and the information about the transmit power in the timeslot occupied by the second cell; send the time-frequency resource information of the second cell to the second cell, so that the second cell performs time-frequency resource allocation according to the time-frequency resource information of the second cell; and perform time-frequency resource allocation according to the time-frequency resource information of the first cell; and the second cell is configured to: send the time-frequency resource allocation request to the first cell; receive the time-frequency resource information that is of the second cell and sent by the first cell; and perform time-frequency resource allocation according to the time-frequency resource information of the second cell.

This embodiment of the present invention provides a communications system. A first cell acquires time-frequency resource information of the first cell, where the time-frequency resource information of the first cell is used for the first cell to perform time-frequency resource allocation; and performs time-frequency resource allocation according to the time-frequency resource information of the first cell. According to this solution, the time-frequency resource information of the first cell is acquired, and the time-frequency resource information of the first cell is determined according to relationship information of interference from an interfering cell (that is, a second cell) to an interfered cell (that is, a first cell); therefore, interference from the interfering cell to the interfered cell can be reduced after the interfered cell performs time-frequency resource allocation according to the time-frequency resource information.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A resource determining method, comprising:
   acquiring, by a multi-standard network controller, relationship information of interference imposed on a first cell by a second cell, wherein the relationship information of interference is used to indicate interference imposed on the first cell by the second cell, and the second cell and the first cell have different standards;
   determining, by the multi-standard network controller, time-frequency resource information of the second cell according to the relationship information of interference, wherein the time-frequency resource information of the second cell is used for the second cell to perform time-frequency resource allocation;
   acquiring strength of a signal of the second cell and carrier configuration information of the second cell; and
   determining the relationship information of interference according to the strength of the signal of the second cell, the carrier configuration information of the second cell, and carrier power configuration information of the second cell.

2. The method according to claim 1, wherein the relationship information of interference comprises strength of a signal of the second cell, strength information of interference from a signal of the second cell to a signal of the first cell, or information about a path loss from the second cell to the first cell.

3. The method according to claim 1, wherein the determining time-frequency resource information of the second cell according to the relationship information of interference comprises:
   if a time-frequency resource allocation request sent by the second cell is received, allocating the time-frequency resource information of the second cell according to the relationship information of interference.

4. The method according to claim 3, wherein the method further comprises:
   determining time-frequency resource information of the first cell according to the relationship information of interference, wherein the time-frequency resource information of the first cell is used for the first cell to perform time-frequency resource allocation.

5. The method according to claim 3, wherein the acquiring relationship information of interference imposed on a first cell by a second cell comprises:
   acquiring network plan data or drive test data, wherein the network plan data comprises location information of the first cell and location information of the second cell, and the drive test data comprises strength of a signal that is of the second cell and is received by a drive test terminal within the first cell; and determining the relationship information of interference according to the network plan data or the drive test data; or
   acquiring strength of a signal of the second cell and carrier configuration information of the second cell, and determining the relationship information of interference according to the strength of a signal and the carrier configuration information.

6. The method according to claim 5, wherein the acquiring strength of a signal of the second cell comprises:
   sending a first measurement instruction to first user equipment, wherein the first measurement instruction is used to instruct the first user equipment to measure the strength of a signal of the second cell; and
   receiving the information about the strength of a signal of the second cell, sent by the first user equipment, of the signal of the second cell.

7. A resource determining method, comprising:
   acquiring, by a multi-standard network controller, relationship information of interference imposed on a first cell by a second cell, wherein the relationship information of interference is used to indicate interference imposed on the first cell by the second cell, and the second cell and the first cell have different standards; and
   determining, by the multi-standard network controller, time-frequency resource information of the second cell according to the relationship information of interference, wherein the time-frequency resource information of the second cell is used for the second cell to perform time-frequency resource allocation, wherein the determining time-frequency resource information of the second cell according to the relationship information of interference comprises:
   if a time-frequency resource allocation request sent by the second cell is received, allocating the time-frequency resource information of the second cell according to the relationship information of interference, wherein the acquiring relationship information of interference imposed on a first cell by a second cell comprises:
   acquiring network plan data or drive test data, wherein the network plan data comprises location information of the first cell and location information of the second cell, and the drive test data comprises strength of a signal that is of the second cell and is received by a drive test terminal within the first cell; and determining the relationship information of interference according to the network plan data or the drive test data; or acquiring strength of a signal of the second cell and carrier configuration information of the second cell, and determining the relationship information of interference according to the strength of a signal and the carrier configuration information, wherein the acquiring strength of a signal of the second cell and carrier configuration information of the second cell, and determining the relationship information of interference according to the strength of a signal and the carrier configuration information comprises:

determining the relationship information of interference according to the strength of a signal of the second cell, the carrier configuration information of the second cell, and carrier power configuration information of the second cell.

8. The method according to claim 7, wherein the carrier configuration information comprises information used to indicate a carrier configured for the second cell, and the carrier power configuration information comprises information used to indicate transmit power of the carrier configured for the second cell.

9. The method according to claim 1, wherein the allocating the time-frequency resource information of the second cell according to the relationship information of interference comprises:

determining the time-frequency resource information of the second cell according to the relationship information of interference and information about transmit power in a timeslot occupied by the second cell.

10. The method according to claim 1, wherein the time-frequency resource information of the second cell comprises carrier configuration information or timeslot configuration information.

11. A multi-standard network controller, comprising:
a memory storing instructions(s); and
a processor, configured to execute the instruction(s) to: acquire relationship information of interference imposed on a first cell by a second cell, wherein the relationship information of interference is used to indicate interference imposed on the first cell by the second cell in a time-frequency domain, and the second cell and the first cell have different standards; determine time-frequency resource information of the second cell according to the relationship information of interference, wherein the time-frequency resource information of the second cell is used for the second cell to perform time-frequency resource allocation; acquire strength of a signal of the second cell and carrier configuration information of the second cell; and determine the relationship information of interference according to the strength of the signal of the second cell, the carrier configuration information of the second cell, and carrier power configuration information of the second cell.

12. The multi-standard network controller according to claim 11, wherein the relationship information of interference comprises strength of a signal of the second cell, strength information of interference from a signal of the second cell to a signal of the first cell, or information about a path loss from the second cell to the first cell.

13. The multi-standard network controller according to claim 11, wherein
the processor is configured to: if a time-frequency resource allocation request sent by the second cell is received, allocate the time-frequency resource information of the second cell according to the relationship information of interference.

14. The multi-standard network controller according to claim 13, wherein
the processor is further configured to determine time-frequency resource information of the first cell according to the relationship information of interference, wherein the time-frequency resource information of the first cell is used for the first cell to perform time-frequency resource allocation.

15. The multi-standard network controller according to claim 13, wherein
the processor is configured to: acquire network plan data or drive test data, wherein the network plan data comprises location information of the first cell and location information of the second cell, and the drive test data comprises strength of a signal that is of the second cell and is received by a drive test terminal within the first cell; and determine the relationship information of interference according to the network plan data or the drive test data; or
the processor is configured to: acquire strength of a signal of the second cell and carrier configuration information of the second cell, and determine the relationship information of interference according to the strength of a signal and the carrier configuration information.

16. The multi-standard network controller according to claim 15, further comprising:
a transmitter, configured to send a first measurement instruction to first user equipment, wherein the first measurement instruction is used to instruct the first user equipment to measure the strength of a signal of the second cell; and
a receiver, configured to receive the strength, sent by the first user equipment, of the signal of the second cell.

17. A multi-standard network controller, comprising:
a memory storing instructions(s); and
a processor, configured to execute the instruction(s) to: acquire relationship information of interference imposed on a first cell by a second cell, wherein the relationship information of interference is used to indicate interference imposed on the first cell by the second cell in a time-frequency domain, and the second cell and the first cell have different standards; and determine time-frequency resource information of the second cell according to the relationship information of interference, wherein the time-frequency resource information of the second cell is used for the second cell to perform time-frequency resource allocation, wherein
the processor is configured to: if a time-frequency resource allocation request sent by the second cell is received, allocate the time-frequency resource information of the second cell according to the relationship information of interference, wherein
the processor is configured to: acquire network plan data or drive test data, wherein the network plan data comprises location information of the first cell and location information of the second cell, and the drive test data comprises strength of a signal that is of the second cell and is received by a drive test terminal within the first cell; and determine the relationship information of interference according to the network plan data or the drive test data; or
the processor is configured to: acquire strength of a signal of the second cell and carrier configuration information of the second cell, and determine the relationship information of interference according to the strength of a signal and the carrier configuration information, wherein the processor is configured to determine the relationship information of interference according to the strength of a signal of the second cell, the carrier configuration information of the second cell, and carrier power configuration information of the second cell.

18. The multi-standard network controller according to claim 17, wherein the carrier configuration information comprises information used to indicate a carrier configured for the second cell, and the carrier power configuration information comprises information used to indicate transmit power of the carrier configured for the second cell.

19. The multi-standard network controller according to claim 11, wherein the processor is configured to determine the time-frequency resource information of the second cell according to the relationship information of interference and information about transmit power in a timeslot occupied by the second cell.

20. The multi-standard network controller according to claim 11, wherein the time-frequency resource information of the second cell comprises carrier configuration information or timeslot configuration information.

* * * * *